US010194297B2

(12) United States Patent
Sasaki et al.

(10) Patent No.: US 10,194,297 B2
(45) Date of Patent: Jan. 29, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Shigehiko Sasaki, Kanagawa (JP); Hirochika Shionoiri, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 190 days.

(21) Appl. No.: 15/058,233

(22) Filed: Mar. 2, 2016

(65) Prior Publication Data

US 2017/0094447 A1 Mar. 30, 2017

(30) Foreign Application Priority Data

Sep. 25, 2015 (JP) ................................ 2015-188544

(51) Int. Cl.

| | |
|---|---|
| ***H04W 4/00*** | (2018.01) |
| ***H04W 12/06*** | (2009.01) |
| ***H04W 4/80*** | (2018.01) |
| ***H04W 76/11*** | (2018.01) |
| ***H04L 12/24*** | (2006.01) |
| ***H04L 29/08*** | (2006.01) |
| ***G06F 21/41*** | (2013.01) |
| ***H04N 1/44*** | (2006.01) |

(Continued)

(52) U.S. Cl.

CPC .............. *H04W 4/80* (2018.02); *G06F 21/41* (2013.01); *H04L 41/22* (2013.01); *H04L 67/148* (2013.01);

(Continued)

(58) Field of Classification Search

CPC combination set(s) only.
See application file for complete search history.

(56) References Cited

U.S. PATENT DOCUMENTS 7,716,721 B2 * 5/2010 Zavalkovsky ...... H04L 63/0815 709/225
9,729,642 B2 * 8/2017 Ashley .................. H04L 67/148

(Continued)

FOREIGN PATENT DOCUMENTS

CN 104049584 A 9/2014
EP 1303102 A2 * 4/2003 ............. H04L 63/08

(Continued)

OTHER PUBLICATIONS

Communication dated Jun. 7, 2018 from the State Intellectual Property Office of the P.R.C. in counterpart Chinese application No. 201610211610.5.

*Primary Examiner* — Nay A Maung
*Assistant Examiner* — Erica L Fleming-Hall
(74) *Attorney, Agent, or Firm* — Sughrue Mion, PLLC

(57) ABSTRACT

An information processing apparatus includes a session generating unit, an associating unit, and a processing unit. The session generating unit generates, in a case where an operation is accepted from a first terminal with a user not uniquely identified, first session information in association with the first terminal and generates, in a case where an operation is accepted from a second terminal, second session information in association with the second terminal. The associating unit associates the first session information with the second session information in a case where an operation for associating the first terminal with the second terminal is accepted. The processing unit performs, in a case where the first session information is associated with the second session information, a process using an operation log stored in association with the first terminal, in response to an operation performed using the second terminal.

16 Claims, 15 Drawing Sheets

(51) Int. Cl.

| | |
|---|---|
| *H04W 84/12* | (2009.01) |
| *G06F 21/60* | (2013.01) |
| *H04L 29/06* | (2006.01) |

(52) U.S. Cl.
CPC .............. *H04N 1/44* (2013.01); *H04W 12/06* (2013.01); *H04W 76/11* (2018.02); *G06F 21/608* (2013.01); *H04L 63/08* (2013.01); *H04L 67/143* (2013.01); *H04W 84/12* (2013.01)

(56) References Cited

U.S. PATENT DOCUMENTS

| | | | | |
|---|---|---|---|---|
| 2005/0154873 | A1* | 7/2005 | Cam-Winget | H04L 63/0435 713/150 |
| 2007/0282990 | A1* | 12/2007 | Kumar | H04L 65/1016 709/223 |
| 2009/0025079 | A1* | 1/2009 | Tanizawa | H04L 63/08 726/14 |
| 2014/0282257 | A1* | 9/2014 | Nixon | G05B 11/01 715/835 |
| 2015/0002888 | A1 | 1/2015 | Tsujimoto | |
| 2015/0012995 | A1* | 1/2015 | Korat | H04W 12/06 726/8 |
| 2015/0363601 | A1* | 12/2015 | Kamishiro | G06F 21/6254 726/26 |

FOREIGN PATENT DOCUMENTS

| | | |
|---|---|---|
| JP | 2006-220940 A | 8/2006 |
| JP | 2013-176915 A | 9/2013 |

* cited by examiner

FIG. 8

| | | |
|---|---|---|
| USER IDENTIFICATION INFORMATION | anon#LP_1 | |
| TERMINAL IDENTIFICATION INFORMATION | LP(127.0.0.1) | |
| DISPLAY-RELATED INFORMATION | MENU SCREEN | SCAN PROCESS SELECTED |
| | SERVER ADDRESS INPUT SCREEN | (DISPLAYED) |
| LOGIN STATUS | LOGGED OUT | |
| PROCESS-RELATED INFORMATION | SCAN PROCESS<br>•RESOLUTION: 200 dpi<br>•DESTINATION: SERVER X | |
| PROCESS STATUS | IN EXECUTION | |

FIG. 9

| | | |
|---|---|---|
| USER IDENTIFICATION INFORMATION | anon#SMP_1 | |
| TERMINAL IDENTIFICATION INFORMATION | SMP(192.168.x.x) | |
| DISPLAY-RELATED INFORMATION | MENU SCREEN | (DISPLAYED) |
| LOGIN STATUS | LOGGED OUT | |
| PROCESS-RELATED INFORMATION | NONE | |
| PROCESS STATUS | NONE | |

FIG. 10A

| | | |
|---|---|---|
| USER IDENTIFICATION INFORMATION | anon#LP_1 | |
| TERMINAL IDENTIFICATION INFORMATION | LP(127.0.0.1) | |
| DISPLAY-RELATED INFORMATION | MENU SCREEN | SCAN PROCESS SELECTED |
| | SERVER ADDRESS INPUT SCREEN | (DISPLAYED) |
| LOGIN STATUS | LOGGED OUT | |
| PROCESS-RELATED INFORMATION | SCAN PROCESS<br>•RESOLUTION: 200 dpi<br>•DESTINATION: SERVER X | |
| PROCESS STATUS | IN EXECUTION | |
| ASSOCIATION INFORMATION | anon#SMP_1 | |

FIG. 10B

| | | |
|---|---|---|
| USER IDENTIFICATION INFORMATION | anon#SMP_1 | |
| TERMINAL IDENTIFICATION INFORMATION | SMP(192.168.x.x) | |
| DISPLAY-RELATED INFORMATION | MENU SCREEN | (DISPLAYED) |
| LOGIN STATUS | LOGGED OUT | |
| PROCESS-RELATED INFORMATION | NONE | |
| PROCESS STATUS | NONE | |
| ASSOCIATION INFORMATION | anon#LP_1 | |

FIG. 13

| | | |
|---|---|---|
| USER IDENTIFICATION INFORMATION | anon#LP_2 | |
| TERMINAL IDENTIFICATION INFORMATION | LP(127.0.0.1) | |
| DISPLAY-RELATED INFORMATION | MENU SCREEN | (DISPLAYED) |
| LOGIN STATUS | LOGGED OUT | |
| PROCESS-RELATED INFORMATION | NONE | |
| PROCESS STATUS | NONE | |

FIG. 14

| | | |
|---|---|---|
| USER IDENTIFICATION INFORMATION | anon#LP_1 | |
| TERMINAL IDENTIFICATION INFORMATION | NONE | |
| DISPLAY-RELATED INFORMATION | MENU SCREEN | SCAN PROCESS SELECTED |
| | SERVER ADDRESS INPUT SCREEN | (DISPLAYED) |
| LOGIN STATUS | LOGGED OUT | |
| PROCESS-RELATED INFORMATION | SCAN PROCESS<br>•RESOLUTION: 200 dpi<br>•DESTINATION: SERVER X | |
| PROCESS STATUS | IN EXECUTION | |
| ASSOCIATION INFORMATION | anon#SMP_1 | |

| SESSION INFORMATION | ASSOCIATION |
|---|---|
| anon#LP_1 | NONE |

| SESSION INFORMATION | ASSOCIATION |
|---|---|
| anon#LP_1 | anon#SMP_1 |
| anon#SMP_1 | anon#LP_1 |

| SESSION INFORMATION | ASSOCIATION |
|---|---|
| anon#LP_1 | anon#SMP_1, anon#PC_1 |
| anon#SMP_1 | anon#LP_1, anon#PC_1 |
| anon#PC_1 | anon#LP_1, anon#SMP_1 |

FIG. 21

| | | |
|---|---|---|
| USER IDENTIFICATION INFORMATION | anon#LP_1 | |
| TERMINAL IDENTIFICATION INFORMATION | LP(127.0.0.1) | |
| DISPLAY-RELATED INFORMATION | MENU SCREEN | SCAN PROCESS SELECTED |
| | SERVER ADDRESS INPUT SCREEN | (DISPLAYED) |
| LOGIN STATUS | LOGGED OUT | |
| PROCESS-RELATED INFORMATION | SCAN PROCESS<br>•RESOLUTION: 200 dpi<br>•DESTINATION: SERVER X | |
| PROCESS STATUS | IN EXECUTION | |
| ASSOCIATION INFORMATION | anon#SMP_1 (RESERVED) | |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-188544 filed Sep. 25, 2015.

BACKGROUND (i) Technical Field

The present invention relates to an information processing apparatus, an information processing method, and a non-transitory computer readable medium.

(ii) Related Art

Information processing apparatuses are available that are operated from plural terminals and are utilized by plural users.

SUMMARY

According to an aspect of the invention, there is provided an information processing apparatus including a session generating unit, an associating unit, and a processing unit. The session generating unit generates, in a case where an operation is accepted from a first terminal with a user not uniquely identified, first session information in association with the first terminal, the first session information serving as a unit for managing communication for the first terminal. The session generating unit also generates, in a case where an operation is accepted from a second terminal, second session information in association with the second terminal, the second session information serving as a unit for managing communication for the second terminal. The associating unit associates the first session information with the second session information in a case where an operation for associating the first terminal with the second terminal is accepted. The processing unit performs, in a case where the first session information is associated with the second session information, a process using an operation log that is stored in association with the first terminal, in response to an operation performed using the second terminal.

BRIEF DESCRIPTION OF THE DRAWINGS

An exemplary embodiment of the present invention will be described in detail based on the following figures, wherein:

FIG. 8 illustrates an example of stored session information;

FIG. 9 illustrates an example of session information for the user terminal;

FIGS. 10A and 10B illustrate examples of session information subjected to an association process;

FIG. 13 illustrates an example of next session information for the operation panel;

FIG. 14 illustrates session information from which terminal identification information is deleted;

FIG. 21 illustrates an example of session information according to a modification.

DETAILED DESCRIPTION

1 Exemplary Embodiment

1-1 Configuration

Figure 1:
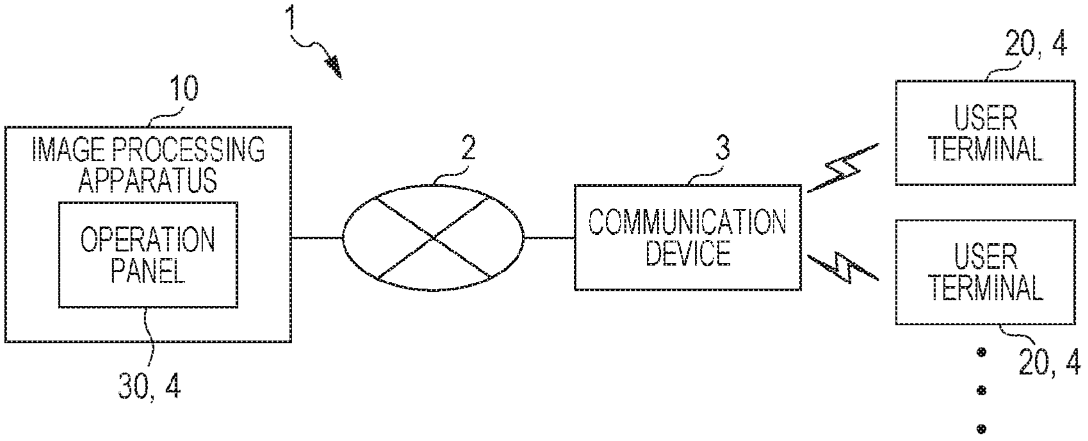
FIG. 1 illustrates an overall configuration of an information processing system according to an exemplary embodiment.

FIG. 1 illustrates an overall configuration of an information processing system 1 according to an exemplary embodiment. The information processing system 1 includes a communication line 2, a communication device 3, an image processing apparatus 10, and plural user terminals 20. In this exemplary embodiment, the information processing system 1 provides a user with functions, such as copy, scan, fax, and print (output of image data on a medium).

Examples of the communication line 2 include the Internet, a mobile communication network, and a telephone line. The communication line 2 implements communication between apparatuses connected thereto. The image processing apparatus 10 and the communication device 3 are connected to the communication line 2. The communication device 3 is an apparatus having a communication function. In this exemplary embodiment, the communication device 3 performs wireless communication based on a wireless local area network (LAN) standard. The communication device 3 wirelessly communicates with the user terminals 20. The communication device 3 also communicates with the image processing apparatus 10 via the communication line 2. That is, the image processing apparatus 10 communicates with the user terminal 20 via the communication line 2 and the communication device 3. Note that the communication device 3 may be omitted. For example, the image processing apparatus 10 may have a function (WiFi Direct (registered trademark)) of the communication device 3 and may wirelessly communicate with the user terminals 20.

The image processing apparatus 10 performs processes, such as an image forming process for forming an image on a medium and an image scanning process for scanning an image on a medium. These processes are performed when the aforementioned functions, such as copy, scan, fax, and print, are provided to the user. The image processing apparatus 10 includes an operation panel 30 that is used to operate the image processing apparatus 10. The operation panel 30 is a user interface (UI) of the image processing apparatus 10 and is one of terminals (hereinafter, referred to as "operation terminals") that are used to operate the image processing apparatus 10.

A UI is an interface that allows the user to exchange information with an operation-target apparatus (i.e., the image processing apparatus 10 in this exemplary embodiment). The user operates the operation-target apparatus by using the operation terminal. The operation terminal displays a screen in which the user performs an operation and a screen corresponding to the operation (e.g., a screen displaying the result of the operation). The operation panel 30 is fixed on a housing of the image processing apparatus 10 and is used by a user who visits the place where the image processing apparatus 10 is installed. Note that the operation panel 30 may be fixed to the image processing apparatus 10 or may be detachable from the image processing apparatus 10 and utilized as a tablet terminal when it is detached.

Each of the user terminals 20 is a terminal used by a user. The user terminals 20 may be, for example, smartphones, tablet terminals, and personal computers. Each of the user terminals 20 communicates with the image processing apparatus 10 to exchange data used to operate the image processing apparatus 10. Each of the user terminals 20 is one of the operation terminals of the image processing apparatus 10. As described above, the user terminals 20 and the operation panel 30 are operation terminals of the image processing apparatus 10 and are collectively referred to as operation terminals 4 below when they are not distinguished from one another. These operation terminals 4 (specifically, the user terminal 20 and the operation panel 30) serve as an example of a "first terminal" and an example of a "second terminal" according to an aspect of the present invention (when one of the user terminal 20 and the operation panel 30 serves as the "first terminal", the other serves as the "second terminal").

Figure 2:
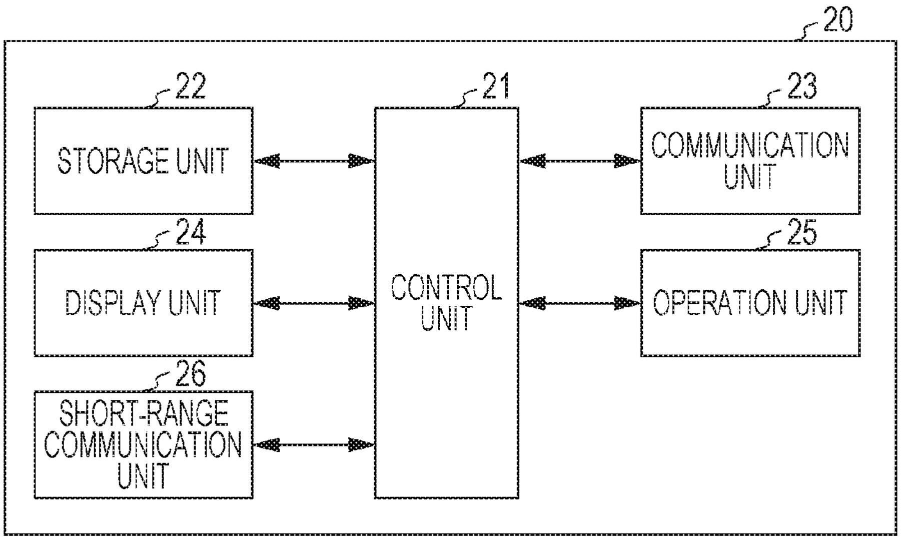
FIG. 2 illustrates a hardware configuration of a user terminal.

FIG. 2 illustrates a hardware configuration of the user terminal 20. The user terminal 20 is a computer including a control unit 21, a storage unit 22, a communication unit 23, a display unit 24, an operation unit 25, and a short-range communication unit 26. The control unit 21 includes a central processing unit (CPU), a read-only memory (ROM), a random access memory (RAM), and a real-time clock. The CPU executes a program stored in the ROM or the storage unit 22 by using the RAM as its workspace, thereby controlling operations of the individual units. The real-time clock computes the current date/time and notifies the CPU of the current date/time. The storage unit 22 includes, for example, a flash memory. The storage unit 22 stores data and programs (e.g., a web application such as a browser) used by the control unit 21 to perform control, and image data, for example.

The communication unit 23 includes an antenna and a communication circuit that performs wireless communication based on a wireless LAN standard. For example, the communication unit 23 wirelessly communicates with the communication device 3 illustrated in FIG. 1. The display unit 24 includes, for example, a liquid crystal display. The display unit 24 is controlled by the control unit 21 to display an image on the display panel. For example, in the case where the user terminal 20 is a smartphone or a tablet terminal, the operation unit 25 includes a touch sensor (also called a touchscreen or a touch panel) disposed on the display panel and buttons disposed on a housing of the user terminal 20, for example. The operation unit 25 accepts a user operation, such as tapping, and supplies the control unit 21 with operation data indicating the type of the operation. In the case where the user terminal 20 is a personal computer, the operation unit 25 may include a keyboard and a mouse. The control unit 21 performs control in accordance with the supplied operation data.

The short-range communication unit 26 includes a circuit for short-range wireless communication. The short-range communication unit 26 performs short-range wireless communication with an external apparatus. As the short-range wireless communication, communication is used via which authentication information is exchanged by using a Near Field Communication (NFC) tag or is exchanged wirelessly via Bluetooth (registered trademark) or a piconet that is dynamically formed between plural Bluetooth devices when the Bluetooth devices are located close to one another. In the exemplary embodiment, the short-range communication unit 26 is an NFC reader that performs NFC-based communication as short-range wireless communication.

Figure 3:
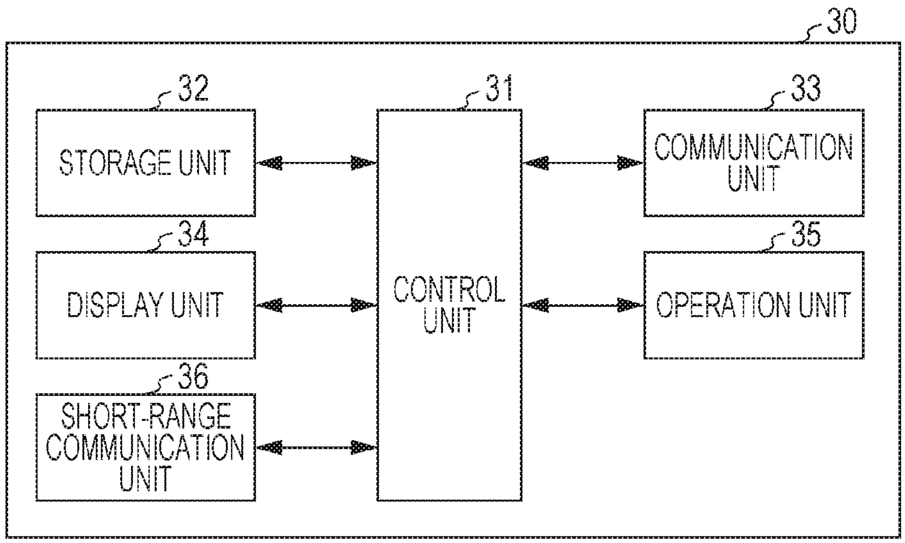
FIG. 3 illustrates a hardware configuration of an operation panel.

FIG. 3 illustrates a hardware configuration of the operation panel 30. The operation panel 30 is a computer including a control unit 31, a storage unit 32, a communication unit 33, a display unit 34, an operation unit 35, and a short-range communication unit 36. Each of the components of the operation panel 30 other than the communication unit 33 is a hardware component equivalent to the corresponding component assigned the same name in FIG. 2. The communication unit 33 includes a communication circuit that performs communication based on a wired LAN standard and a port to which a connector of a communication cable (specifically, a LAN cable) is inserted. Note that the communication unit 33 may perform wireless communication as well as wired communication. For example, in the case where the operation panel 30 is detachable as described above, the communication unit 33 performs wireless communication.

Figure 4:
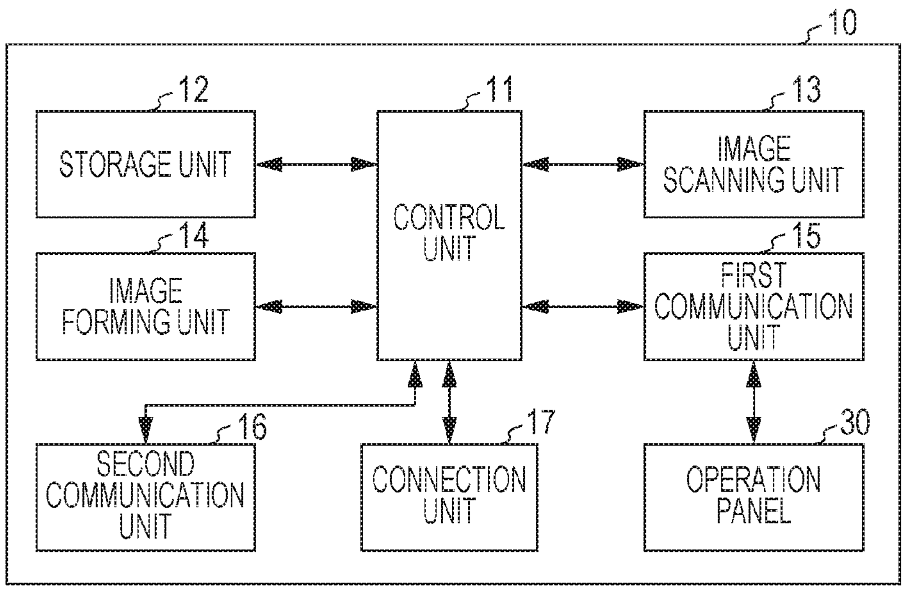
FIG. 4 illustrates a hardware configuration of an image processing apparatus.

FIG. 4 illustrates a hardware configuration of the image processing apparatus 10. The image processing apparatus 10 is a computer including a control unit 11, a storage unit 12, an image scanning unit 13, an image forming unit 14, a first communication unit 15, a second communication unit 16, and a connection unit 17. The image processing apparatus 10 also includes the above-described operation panel 30 that functions as a UI unit. The control unit 11 controls each unit other than the operation panel 30 in this exemplary embodiment. The control unit 11 is a hardware component equivalent to the control unit 21 illustrated in FIG. 2. The storage unit 12 includes, for example, a hard disk drive. The storage unit 12 stores data and programs used by the control unit 11 to perform control, and image data, for example.

The image scanning unit 13 performs an image scanning process for scanning an image on an original by using a charge coupled device (CCD) system, for example. The image scanning unit 13 optically scans an image of content on a medium, such as paper, and supplies image data representing the scanned image to the control unit 11. The image forming unit 14 performs an image forming process for forming an image on a medium by using an electrophotographic system, for example. The image forming unit 14 forms an image represented by image data supplied by the control unit 11 on a medium, such as paper. The aforementioned systems used to scan and form an image are merely examples, and other systems may be used. The first communication unit 15 is connected to the communication unit 33 of the operation panel 30 by a communication cable or a data bus. The first communication unit 15 communicates with the operation panel 30 without using any external apparatus. That is, the communication unit 33 communicates with the image processing apparatus 10 without using any external apparatus. Note that, in the case where the communication unit 33 performs wireless communication as described above, the first communication unit 15 also performs wireless communication.

The second communication unit 16 serves as a communication interface and includes a communication circuit that performs communication based on a wired LAN standard or a wireless LAN standard, a port to which a connector of a communication cable (e.g., a LAN cable) is inserted, and a wireless transmitter/receiver based on the wireless LAN standard. The second communication unit 16 performs a communication process to communicate with an apparatus connected to this interface. The second communication unit 16 is connected to the communication line 2 illustrated in FIG. 1 and communicates with, for example, the user terminals 20 via an external apparatus (i.e., an external apparatus for the image processing apparatus 10, for example, the communication device 3). The connection unit 17 includes, for example, a slot to which a storage medium such as an SD memory card is connected. The connection unit 17 is connected to such a storage medium. The control unit 11 reads data stored on the storage medium and writes data to the storage medium via the connection unit 17. The operation panel 30 includes the components described with reference to FIG. 3. The operation panel 30 communicates with the first communication unit 15.

The control unit 11 of the image processing apparatus 10, the control unit 21 of the user terminal 20, and the control unit 31 of the operation panel 30 execute programs and controls the individual units. In this way, functions described below are implemented.

Figure 5:
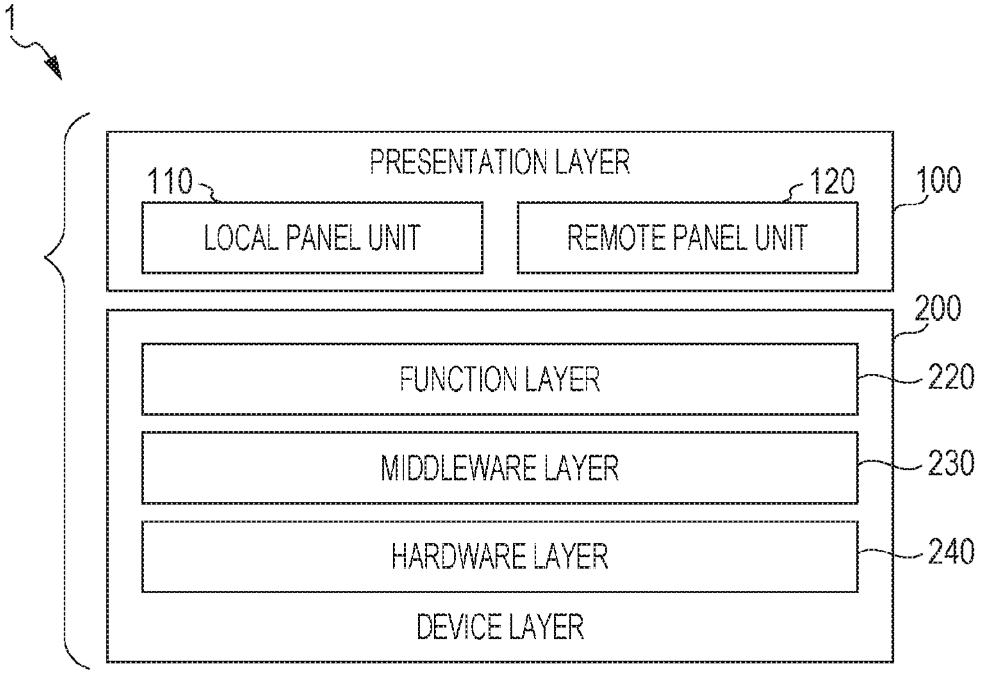
FIG. 5 illustrates a structure of functional layers of the information processing system.

FIG. 5 illustrates a structure of functional layers of the information processing system 1. The information processing system 1 includes a presentation layer 100 and a device layer 200. The presentation layer 100 is a layer that implements a function of accepting a user operation (i.e., a user interface). The device layer 200 is a layer that performs processes in response to user operations accepted by the presentation layer 100 and provides the aforementioned various functions, such as copy and scan.

The presentation layer 100 includes a local panel unit 110 and a remote panel unit 120. The local panel unit 110 is an operation panel included in the image processing apparatus 10. The local panel unit 110 is (locally) used by a user who visits the place where the image processing apparatus 10 is installed. The remote panel unit 120 is an operation panel connected to the image processing apparatus 10 via the communication line 2 and the communication device 3 illustrated in FIG. 1. The remote panel unit 120 is used by a user who is at a (remote) place apart from the image processing apparatus 10.

The device layer 200 includes a function layer 220, a middleware layer 230, and a hardware layer 240. The function layer 220 is a layer that implements functions of processing data in accordance with an intended usage, such as a copy function and a scan function. The middleware layer 230 is a layer that is located between the function layer 220 and the hardware layer 240 and that performs general-purpose processes in response to user operations. The hardware layer 240 is a layer that physically implements processes, such as image scanning and image formation.

Figure 6:
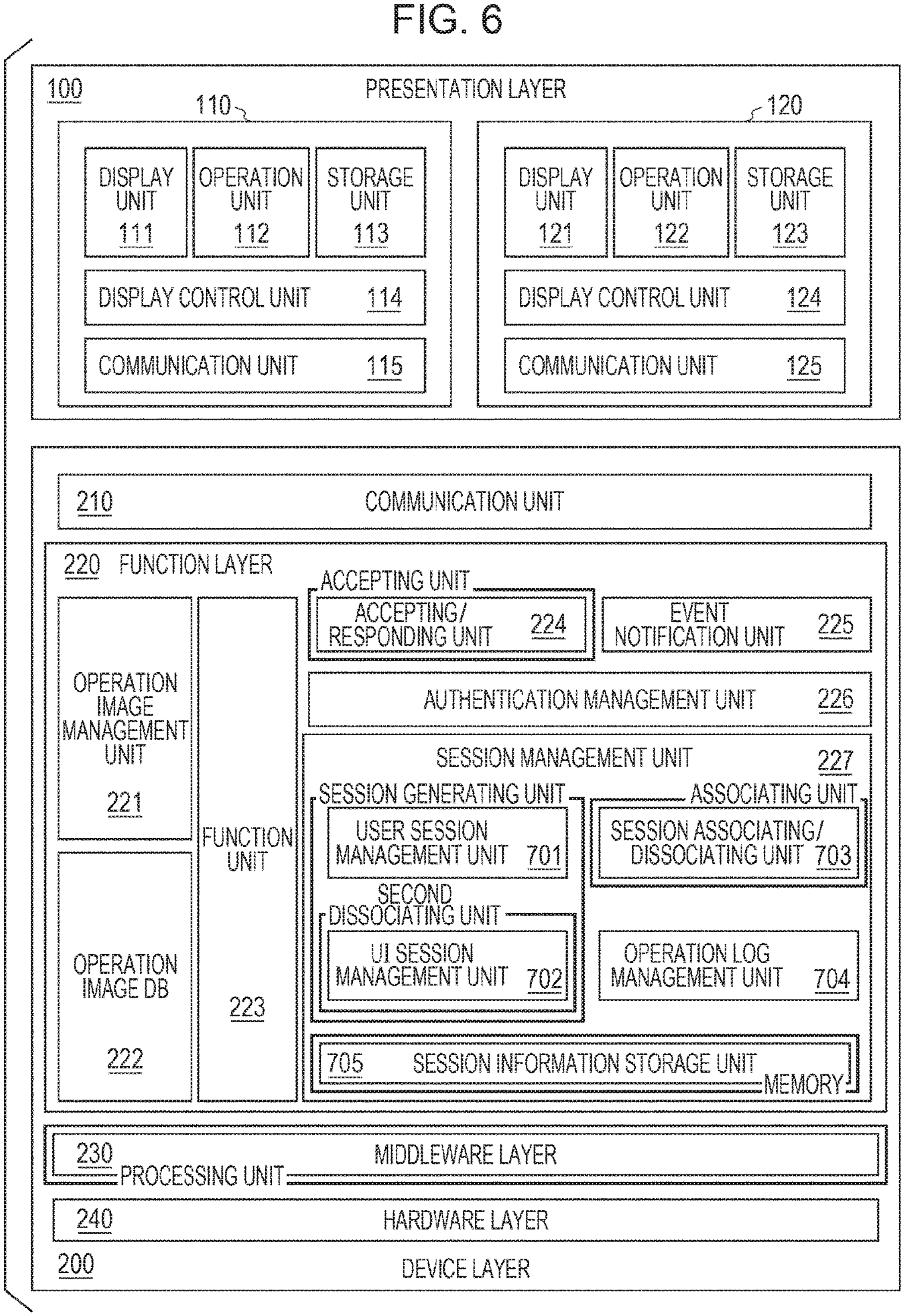
FIG. 6 illustrates details of a functional configuration of the information processing system.

FIG. 6 illustrates details of a functional configuration of the information processing system 1. The local panel unit 110 includes a display unit 111, an operation unit 112, a storage unit 113, a display control unit 114, and a communication unit 115. The display unit 111 displays an image. The operation unit 112 accepts a user operation. The storage unit 113 stores images to be displayed. The display control unit 114 controls the display unit 111 to display an image (hereinafter, referred to as an "operation image") used to operate the image processing apparatus 10 and information indicating the status of a process performed in response to the operation. The communication unit 115 controls communication between the display control unit 114 and the device layer 200. The remote panel unit 120 includes a display unit 121, an operation unit 122, a storage unit 123, a display control unit 124, and a communication unit 125. These units have functions equivalent to the respective components of the local panel unit 110 assigned the same names.

The device layer 200 includes a communication unit 210. The communication unit 210 implements communication between the image processing apparatus 10 and the presentation layer 100. The communication unit 210 implements communication based on Hypertext Transfer Protocol (HTTP, defined by RFC 7230, for example)/Hypertext Transfer Protocol Secure (HTTPS). In addition, the communication unit 210 implements Simple Object Access Protocol (SOAP)-based communication for communicating data written in Extensible Markup Language (XML) (hereinafter, referred to as "XML data"), for example. For example, the communication unit 210 receives XML data indicating an HTTP request that is transmitted from the presentation layer 100 and supplies the XML data to an operation image management unit 221 (described later). The communication unit 210 also receives, as a response, XML data indicating an HTTP response supplied by the operation image management unit 221 (described later) and transmits the XML data to the presentation layer 100.

The communication unit 210 also supports the WebSocket standard (defined by RFC 6455, for example). Based on this standard, once a connection to the presentation layer 100 is established as a result of a Transmission Control Protocol (TCP) handshake procedure, the communication unit 210 implements not only communication of XML data indicating an HTTP request and an HTTP response but also, for example, transmission of XML data from an event notification unit 225 (described later) to the presentation layer 100 at a given timing. With this configuration, not only so-called pull-type communication based on an HTTP request originating from the presentation layer 100 but also push-type communication originating from the image processing apparatus 10 are performed in the information processing system 1.

The function layer 220 includes the operation image management unit 221, an operation image database (DB) 222, a function unit 223, an accepting/responding unit 224, the event notification unit 225, an authentication management unit 226, and a session management unit 227. The operation image management unit 221 supplies the aforementioned operation images (i.e., images used to operate the image processing apparatus 10) to the operation terminal 4 via the communication unit 210. The operation image DB 222 stores the operation images (specifically, image data representing the operation images). In response to a request for the operation image from the operation terminal 4, the operation image management unit 221 transmits, via the communication unit 210, the requested operation image to the operation terminal 4 that has made the request.

The function unit 223 includes modules that implement functions provided to the user by the image processing apparatus 10.

Figure 7:
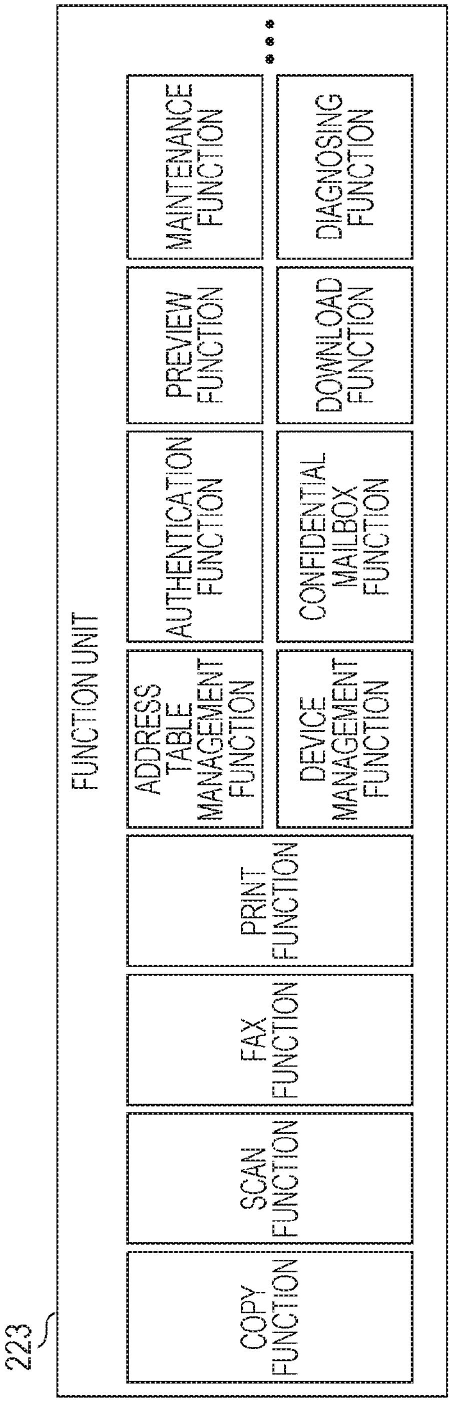
FIG. 7 illustrates an example of modules included in a function unit.

FIG. 7 illustrates an example of the modules included in the function unit 223. The function unit 223 includes modules that implement a copy function, a scan function, a fax function, a print function, an address table management function (a function of managing address information), a device management function (a function of managing the loading state of an original at the image scanning unit 13, and states of a medium and consumables used by the image forming unit 14), an authentication function, a confidential mailbox function (a function of managing electronic documents stored in the image processing apparatus 10), a preview function, a download function (a function of controlling updating of programs), a maintenance function (a function of performing maintenance of hardware in response to a remote request), and a diagnosing function (a function of making a diagnosis on hardware).

The function unit 223 performs, for example, a scan process, a fax transmission process, and a print process (processes for providing the scan function, the fax function, and the print function) as well as the aforementioned copy process. The copy process includes the image scanning process and the image forming process respectively performed by the image scanning unit 13 and the image forming unit 14 illustrated in FIG. 4. The scan process includes the image scanning process. The fax transmission process includes a fax transmission process performed by the second communication unit 16. The print process includes a communication process performed by the second communication unit 16 and the image forming process. The scan process and the fax transmission process may additionally include a data communication process using the second communication unit 16, a writing process for writing data to the storage unit 12, and a reading process for reading stored data from the storage unit 12 depending on how the data is acquired and output.

The function unit 223 is instructed to perform a process by the middleware layer 230. After starting performing the process, the function unit 223 supplies the session management unit 227 with information indicating the status of the process being performed. The function unit 223 also supplies the processing result to the event notification unit 225 via the middleware layer 230.

The accepting/responding unit 224 accepts an operation for operating the image processing apparatus 10 that is performed using the operation terminal 4. Specifically, the accepting/responding unit 224 accepts a request for a process from the presentation layer 100 implemented by the operation terminal 4 and requests the function unit 223 to perform the process in accordance with the type of the process for which the request is accepted. In addition, the accepting/responding unit 224 transmits response data indicating a response to the accepted request (such as data indicating acceptance of the request or data indicating the status of the process) to the presentation layer 100 via the communication unit 210.

The event notification unit 225 notifies the presentation layer 100 of, for example, information indicating the status of the process, the information being supplied by the function unit 223 via the middleware layer 230. The authentication management unit 226 manages authentication information used in user authentication. When a user logs in to the image processing apparatus 10 or performs a process, the authentication management unit 226 checks the privilege granted to the user and authenticates the user who operates the image processing apparatus 10.

The session management unit 227 manages a connection of the operation terminal 4, the status of the operation on the operation terminal 4, and the status of the process. The session management unit 227 includes a user session management unit 701, a UI session management unit 702, a session associating/dissociating unit 703, an operation log management unit 704, and a session information storage unit 705.

The term “session” refers to a series of operations or communications performed from when the operation terminal 4 establishes a connection to the image processing apparatus 10 to when the connection is disconnected or from when the user logs in to when the user logs out. Sessions are used as units in which the series of operations or communications is managed. The image processing apparatus 10 is operated by using the operation terminal 4 for which a session is generated. The term “session” encompasses a user session and a UI session. The session management unit 227 stores session information, which includes user session information indicating details of a user session and UI session information indicating details of a UI session.

User session information indicates a log of operations for operating the image processing apparatus 10 performed by the user using the operation terminal 4 and the status of a process that is performed in response to a user instruction. The operation log indicates, for example, which screen the user has viewed and which function the user has utilized. If the copy function is utilized, the operation log indicates which setting information items have been selected from among the sheet size, the sheet orientation, the color or black-and-white mode, the image quality, and the sorting setting. If the fax function is utilized, the operation log indicates the fax number of the transmission destination. In addition, the status of the process indicates a status as to whether the process is being performed, is completed, or is suspended.

UI session information indicates communication management information regarding communication with the operation terminal 4 operated by the user. The communication management information includes information necessary for managing a communication connection, for example, the IP address and the type of a program (for example, browser) running on the operation terminal 4. The session information including the UI session information is used as a unit in which communication for the operation terminal 4 is managed. The communication for the operation terminal 4 is communication including at least one of communication in which the operation terminal 4 serves as the transmission source and communication in which the operation terminal 4 serves as the transmission destination.

The user session management unit 701 generates user session information for each user who has logged in to the image processing apparatus 10 and updates the generated user session information. The user session information includes user identification information for identifying the logged-in user. The user identification information is, for example, a character string indicating the user identification (ID) or the user name used for login.

The user session management unit 701 issues a yet-to-be-authenticated user ID (user identification information for identifying a yet-to-be-authenticated user) indicating the yet-to-be-authenticated user in the case where the operation terminal 4 is connected to the image processing apparatus 10 and the user is able to operate the image processing apparatus 10 even if the user has not logged in to the image processing apparatus 10. The user session management unit 701 generates and manages user session information in association with the yet-to-be-authenticated user ID. Here, the term "authenticating" refers to uniquely identifying the user by comparing information input when the user utilizes an information processing apparatus (the image processing apparatus 10) with information for identifying each registered person (confirming the privilege of the identified user is referred to as "authorizing").

Accordingly, a yet-to-be-authenticated user, i.e., a user who has not been authenticated, indicates a user who is not uniquely identified. For example, in the case where plural users share a guest account or in the case where a common password is set in the information processing apparatus and whoever knows the password is able to utilize the information processing apparatus, the users who utilize the information processing apparatus are included in the yet-to-be-authenticated users. The user session management unit 701 issues the yet-to-be-authenticated user ID and generates user session information when the operation terminal 4 is ready to communicate with (is connected to) the image processing apparatus 10.

The user session management unit 701 manages the user session information in association with the yet-to-be-authenticated user ID until a session end condition is satisfied. For example, when the user logs in, when the user performs an operation to give an instruction for finishing using the operation terminal 4 (such as an operation of pressing a reset button), or when a predetermined period has passed without any operation being performed (so-called timeout occurs), the session end condition is satisfied. In the case where the session end condition is satisfied as a result of the user's login, the user session management unit 701 generates user session information including the user ID of the user. In the case where the session end condition is satisfied as a result of the other factors, the user session management unit 701 issues another yet-to-be-authenticated user ID and generates new user session information.

The operation log management unit 704 generates operation log information indicating a log of operations accepted by the accepting/responding unit 224, that is, user operations performed using the operation terminal 4 and updates the operation log information every time a user operation is performed. After generating and updating the operation log information, the operation log management unit 704 supplies the operation log information to the user session management unit 701. The user session management unit 701 associates the supplied operation log information with the user identification information (including the yet-to-be-authenticated user ID) to generate and update the user session information.

The UI session management unit 702 generates UI session information for each of the operation terminals 4 that accept an operation and manages the UI session information by storing it in the session information storage unit 705. The UI session information includes terminal identification information for identifying each of the operation terminals 4. As the terminal identification information, a sign assigned to each of the operation terminals 4 and the IP address of the operation terminal 4 are used in the exemplary embodiment.

As described above, the user session management unit 701 and the UI session management unit 702 function as a session generating unit that generates session information for the operation terminal 4 in association with the operation terminal 4 when an operation is accepted from the operation terminal 4. The session generating unit (the user session management unit 701 and the UI session management unit 702) not only generates session information by issuing the user ID when the user is uniquely identified but also generates session information by issuing a yet-to-be-authenticated user ID when the user is not uniquely identified.

In addition, when the above-described session end condition is satisfied, the UI session management unit 702 dissociates the session information, which has been associated with the operation terminal 4, from the operation terminal 4. For example, when an instruction for finishing using the operation terminal 4 is accepted by the operation terminal 4 (such as when an operation of pressing the reset button is performed), the UI session management unit 702 determines that the session end condition is satisfied and performs this dissociation. In addition, when a predetermined period passes without any operation being performed (such as when timeout occurs), the UI session management unit 702 determines that the session end condition is satisfied and performs this dissociation. The UI session management unit 702 of this case functions as an example of a "second dissociating unit" according to an aspect of the present invention.

The session associating/dissociating unit 703 associates user session information with UI session information. Specifically, the session associating/dissociating unit 703 stores user session information generated by the user session management unit 701 and UI session information generated by the UI session management unit 702 in the session information storage unit 705 in association with each other. The session information storage unit 705 stores session information based on the status of each session.

FIG. 8 illustrates an example of the stored session information. In the example of FIG. 8, a yet-to-be-authenticated user ID "anon#LP_1" is stored as the user identification information. In addition, terminal identification information "LP (127.0.0.1)", display-related information indicating that a "SCAN PROCESS" has been "SELECTED" when a "MENU SCREEN" is displayed and that a "SERVER ADDRESS INPUT SCREEN" is being "DISPLAYED", a login status indicating "LOGGED OUT", process-related information indicating that the "SCAN PROCESS" is being performed, a "RESOLUTION" is set to "200 dpi", and a "DESTINATION" is a "SERVER X", and a process status indicating "IN EXECUTION" are associated with one another.

Among these pieces of information, the user identification information, the display-related information, the process-related information, and the process status are included in the user session information, whereas the terminal identification information and the login status are included in the UI session information. As described above, the session information storage unit 705 stores a log of operations for operating the image processing apparatus 10 performed by using the operation terminal 4. The session information storage unit 705 serves as an example of a "memory" according to an aspect of the present invention.

In the example illustrated in FIG. 8, an operation log of the case where the user (referred to as a user A) for whom the yet-to-be-authenticated user ID has been issued has operated the image processing apparatus 10 by using the operation panel 30 is stored. In the case where the user A continues to operate the image processing apparatus 10 by using the user terminal 20, the process is performed using the stored operation log in the information processing system 1. That is, the operation log created for the operation panel 30 is transferred to and used by the user terminal 20. Hereinafter, the operation terminal 4 from which the operation log is transferred (the operation panel 30 in this example) is referred to as a "first terminal", whereas the operation terminal 4 to which the operation log is transferred (the user terminal 20 in this example) is referred to as a "second terminal".

In the case where a user operation that is performed using at least one of the first and second terminals to associate the first and second terminals with each other is accepted, the session associating/dissociating unit 703 associates session information for the first terminal (hereinafter, referred to as "first session information") with session information for the second terminal (hereinafter, referred to as "second session information"). The session associating/dissociating unit 703 serves as an example of an "associating unit" according to an aspect of the present invention. As a result of this association, the operation log of the first terminal is associated with the second terminal. The user operation performed at this time is an operation for causing the operation log of the first terminal to be transferred to the second terminal and is hereinafter referred to as a "log transfer operation". In the exemplary embodiment, the session associating/dissociating unit 703 assumes an operation for causing the first and second terminals to perform short-range wireless communication as the log transfer operation and associates the operation log of the first terminal with the second terminal.

This log transfer operation is performed when the user terminal 20 serving as the second terminal is connected to the image processing apparatus 10 as the operation terminal 4 after communicating with the image processing apparatus 10. This connection is established as a result of generation of UI session information including the terminal identification information of the user terminal 20 by the UI session management unit 702 and generation of user session information including a yet-to-be-authentication user ID ("anon#SMP_1" in this example) of the user who uses the user terminal 20 by the user session management unit 701 (that is, as a result of generation of session information representing a session between the user terminal 20 and the image processing apparatus 10).

FIG. 9 illustrates an example of session information for the user terminal 20. In the example illustrated in FIG. 9, the yet-to-be-authenticated user ID "anon#SMP_1" is stored as the user identification information. In addition, the terminal identification information "SMP (192.168.x.x)", the displayed-related information indicating that the "MENU SCREEN" is being "DISPLAYED", and the login status indicating "LOGGED OUT" are stored. Since no process has been started, "NONE" is set for the process-related information and the process status.

If the user places the user terminal 20 over or on the NFC reader (the short-range communication unit 36 of the operation panel 30 in this case) to perform NFC communication in this state, for example, the operation panel 30 notifies via the accepting/responding unit 224 the session associating/dissociating unit 703 that NFC communication is performed between the first terminal (the operation panel 30 in this example) and the second terminal (the user terminal 20 in this example). With this notification, an instruction for associating the session information for the first terminal with the session information for the second terminal is sent. Upon receipt of the notification, the session associating/dissociating unit 703 performs a process of associating the first session information with the second session information that are stored in the session information storage unit 705.

FIGS. 10A and 10B illustrate examples of the session information subjected to the association process. FIG. 10A illustrates the session information for the operation panel 30 illustrated in FIG. 8, to which the yet-to-be-authenticated user ID "anon#SMP_1" for the second terminal is added as association information. FIG. 10B illustrates the session information for the user terminal 20 illustrated in FIG. 9, to which the yet-to-be-authenticated user ID "anon#LP_1" for the first terminal is added as the association information. The session associating/dissociating unit 703 associates the first session information with the second session information by adding the yet-to-be-authenticated user ID for the second terminal to the session information in this manner.

For example, the user terminal 20 serving as the second terminal may transmit information for identifying session information associated with the session information of the user terminal 20 to the image processing apparatus 10 in the case where NFC communication is performed. Even in such a case, the session associating/dissociating unit 703 identifies the session information of the second terminal by using the received information and adds the yet-to-be-authenticated user ID included in the identified session information to the session information as in the example illustrated in FIGS. 10A and 10B, thereby performing the association. In the case where the operation panel 30 is detachable from the image processing apparatus 10 and is utilizable as a tablet terminal, the operation panel 30 and the user terminal 20, which are both mobile terminals, may be caused to perform NFC communication. Even in such a case, the association is performed based on information transmitted from either terminal to the image processing apparatus 10.

In a case where an operation of associating the first and second terminals is accepted before the first terminal accepts an instruction for finishing using the first terminal (the operation terminal 4), the session associating/dissociating unit 703 associates the first session information with the second session information. In other words, the session associating/dissociating unit 703 does not perform this association after the first terminal accepts the instruction. With such a configuration, an operation log up until the first terminal accepts an instruction for finishing using the operation terminal 4 is utilized by the second terminal. When the first terminal accepts this instruction, the association between the first terminal and the first session information is cut, and new first session information is ready to be generated in response to an operation performed by a second user different from a first user who has operated the first terminal. The session associating/dissociating unit 703 performs the association in the above-described manner. Accordingly, if the first user gives an instruction for finishing using the operation terminal 4, a situation is avoided where the first session information generated in response to an operation performed by the second user is associated with the second session information generated in response to an operation performed by the first user and the operation log of the second user is used by the first user.

As a result of the association, the image processing apparatus 10 performs a process using the transferred operation log. Examples of the process using the operation log include a process of displaying a screen displayed in the past, a process of re-executing a copy function or the like by using setting information selected by the user when the user has utilized the same function, a fax transmission process using a transmission log, and an email transmission process using data of a scanned file. In the exemplary embodiment, in the case where the first session information and the second session information are associated with each other (i.e., the operation log of the first terminal is associated with the second terminal), the middleware layer 230 performs, in response to an operation performed using the second terminal associated with the second session information, a process using the operation log that is stored in association with the first terminal. The middleware layer 230 serves as an example of a "processing unit" according to an aspect of the present invention.

The middleware layer 230 refers to the session information storage unit 705. If the session information (session information additionally including the association information) illustrated in FIGS. 10A and 10B is stored in the session information storage unit 705, the middleware layer 230 determines that the operation log (the display-related information and the process-related information) included in the session information for the operation panel 30 is associated with the user terminal 20. How the screen displayed on the user terminal 20 changes in this case will be described with reference to FIGS. 11A and 11B.

Figure 11A:
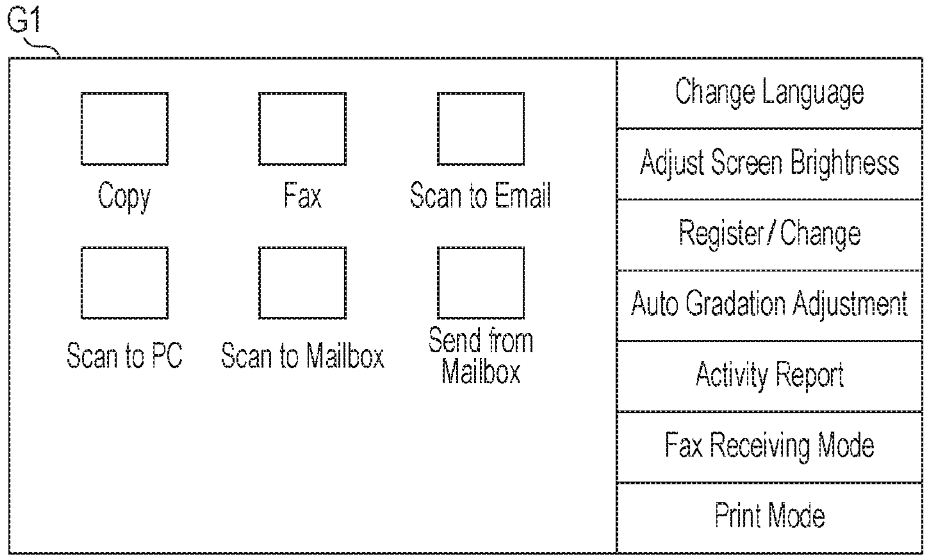
FIGS. 11A and 11B illustrate how a screen displayed on the user terminal changes.
Figure 11B:
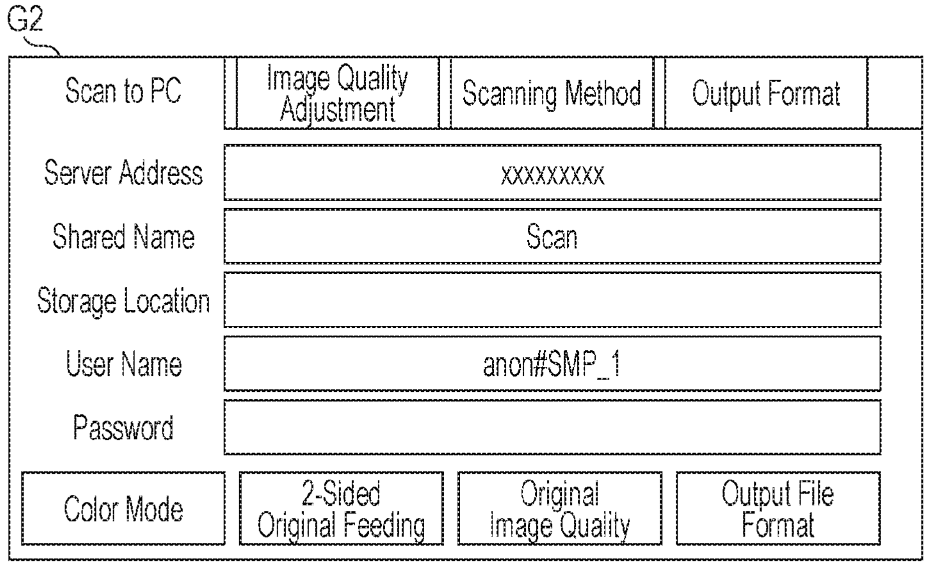

FIGS. 11A and 11B illustrate an example of how the screen displayed on the user terminal 20 changes. FIG. 11A illustrates a menu screen G1 displayed on the user terminal 20. If the user selects "Scan to PC", a server address input screen G2 illustrated in FIG. 11B is displayed. At that time, the middleware layer 230 performs a process of displaying an address ("xxxxxxxxx" in FIG. 11B) of the server X on the basis of the process-related information of the operation log included in the session information for the operation panel 30 illustrated in FIG. 10A. The middleware layer 230 may display the storage location and the password if such information is included in the process-related information of the session information for the operation panel 30.

The middleware layer 230 also notifies a destination that is determined on the basis of the session information associated by the session associating/dissociating unit 703 of information regarding the process. Specifically, the middleware layer 230 determines, as the destination, the operation terminal 4 (the user terminal 20 serving as the second terminal in this exemplary embodiment) associated with the second session information that is associated with the first session information, and notifies the operation terminal 4 of information regarding the process whose process-related information is included in the first session information, that is, information regarding the process that has been started before the first terminal accepts the instruction for finishing using the first terminal.

1-2 Operations

A description will be given below of an operation performed by the information processing system 1 from when the image processing apparatus 10 is powered on to when a process started in response to a user instruction is completed.

Figure 12:
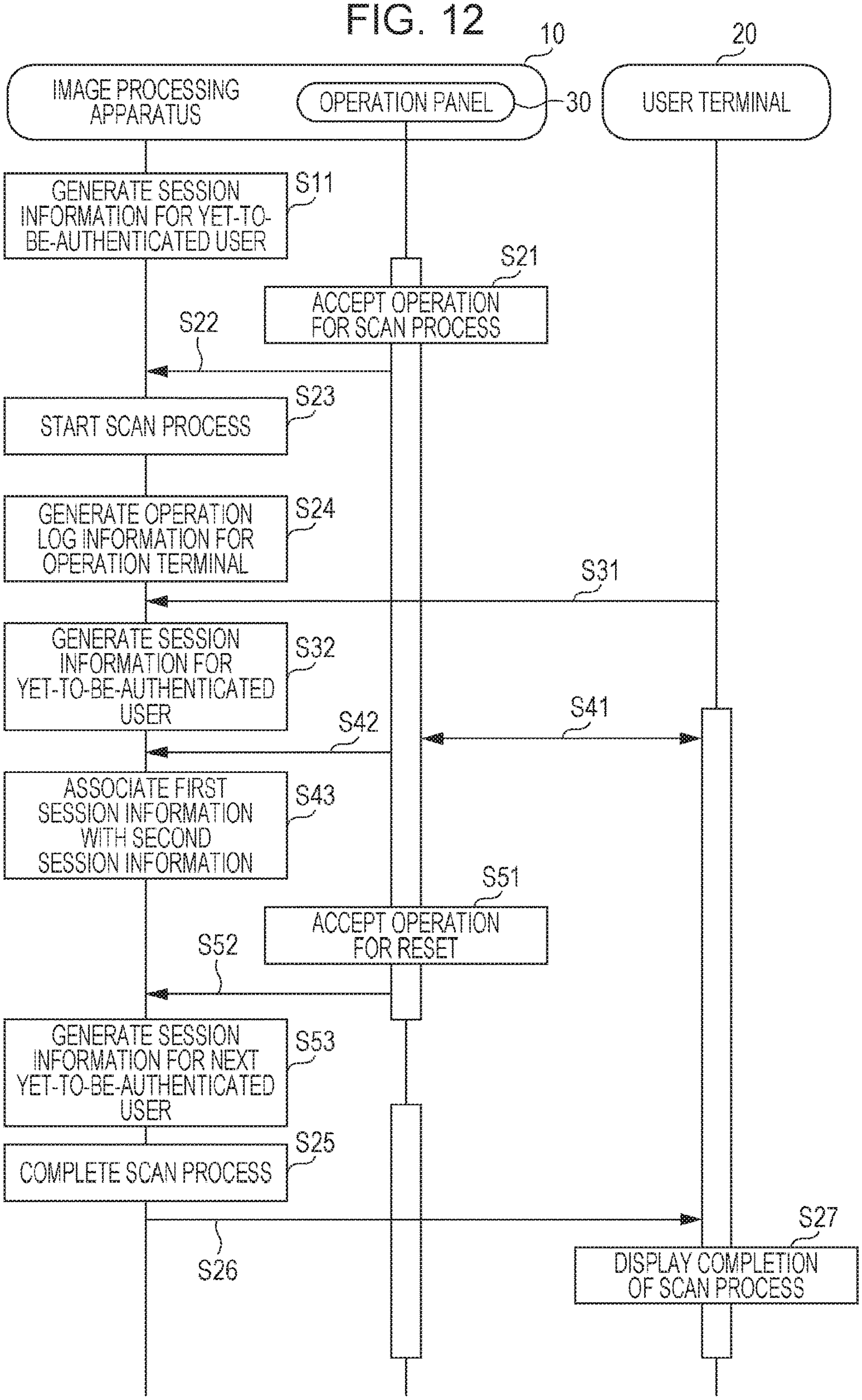
FIG. 12 illustrates an example of a procedure of an operation performed by the information processing system.

FIG. 12 illustrates an example of a procedure of the operation performed by the information processing system 1. The operation illustrated in FIG. 12 starts in response to, for example, power-on of the image processing apparatus 10 by the user. First, the image processing apparatus 10 generates session information for a yet-to-be-authenticated user who uses the operation panel 30 (step S11). As a result of generation of the session information, the operation panel 30 is connected to the image processing apparatus 10 as the operation terminal 4.

In this example, the user places an original at the image processing apparatus 10 and performs an operation to start a scan process by using the operation panel 30. The operation panel 30 accepts this operation (step S21) and instructs the image processing apparatus 10 to start the scan process (step S22). In response to this instruction, the image processing apparatus 10 starts the scan process (step S23). The image processing apparatus 10 also generates operation log information indicating an operation log for the user who uses the operation panel 30 (step S24).

If the user performs an operation to connect the user terminal 20 to the image processing apparatus 10 in parallel to this processing, the user terminal 20 requests the image processing apparatus 10 to establish a connection (step S31). The image processing apparatus 10 generates session information including the terminal identification information of the user terminal 20 that has transmitted the connection request and the yet-to-be-authenticated user ID, for example (step S32). As a result of generation of this session information, the user terminal 20 is connected to the image processing apparatus 10 as the operation terminal 4.

The user then performs an operation of bring (placing) the user terminal 20 near (above or on) the NFC reader (the short-range communication unit 36 of the operation panel 30) as the above-described log transfer operation. In response to this operation, the user terminal 20 and the operation panel 30 perform NFC communication (step S41). Then, in this example, the operation panel 30 notifies the image processing apparatus 10 that NFC communication is performed between the first terminal (the operation panel 30 in this example) and the second terminal (the user terminal 20 in this example) (step S42). Upon receipt of this notification, the image processing apparatus 10 associates the first session information with the second session information, that is, the session information for the first terminal (the operation panel 30) with the session information for the second terminal (the user terminal 20) (step S43).

Then, the user performs an operation of pressing the reset button by using the operation panel 30. As described above, this operation is an operation that satisfies the session end condition. Upon accepting this operation (step S51), the operation panel 30 notifies the image processing apparatus 10 of the acceptance of the operation (step S52). The image processing apparatus 10 determines that the session end condition is satisfied as a result of this operation. In the case where another user performs an operation on the operation panel 30, the image processing apparatus 10 generates session information including a yet-to-be-authenticated user ID for the next user who uses the operation panel 30 as the operation terminal 4 (step S53).

FIG. 13 illustrates an example of the next session information for the operation panel 30. In FIG. 13, a yet-to-be-authenticated user ID "anon#LP_2" is stored as the user identification information. In addition, the terminal identification information "LP (127.0.0.1)" for identifying the operation panel 30, the display-related information indicating that the "MENU SCREEN" is being "DISPLAYED", and the login status indicating "LOGGED OUT" are stored. In addition, since no process is started in response to an operation performed by this yet-to-be-authenticated user, "NONE" is set for the process-related information and the process status.

In this case, the image processing apparatus 10 deletes the terminal identification information for identifying the operation panel 30 from the session information including the yet-to-be-authenticated user ID "anon#LP_1" of the yet-to-be-authenticated user who has been using the operation panel 30, whereby dissociating the first terminal from the first session information.

FIG. 14 illustrates session information from which the terminal identification information is deleted. In FIG. 14, the terminal identification information of the session information illustrated in FIG. 10A is changed from "LP (127.0.0.1)" to "NONE".

As a result, the session for the yet-to-be-authenticated user ID “anon#LP_1” is terminated. Accordingly, even if an operation is performed using the operation panel 30, the session information illustrated in FIG. 14 is not updated, and instead, session information indicating a session newly initiated for the operation panel 30 serving as the operation terminal 4 (the session information illustrated in FIG. 13 including the terminal identification information for identifying the operation panel 30) is updated.

Note that the session information illustrated in FIG. 14 still includes “anon#SMP_1” as the association information. In addition, the association information “anon#LP_1” illustrated in FIG. 10B is still included. Accordingly, the operation terminal 4 for which the yet-to-be-authenticated user ID “anon#SMP_1” has been issued, that is, the user terminal 20 performs a process using the operation log included in this session information. As described above, as a result of dissociation of the first terminal (the operation panel 30 in this example) from the first session, another user is permitted to use the first terminal and the first terminal no longer performs a process using the operation log that has been used. That is, after an operation satisfying the session end condition is performed, a target to which the operation log of the first terminal is made available is limited to the second terminal.

In the example illustrated in FIG. 12, the image processing apparatus 10 completes the scan process after step S53 (step S25). Since this scan process is a process that has been started in response to the operation (operation accepted in step S21) in the session for the yet-to-be-authenticated user ID “anon#LP_1”, the image processing apparatus 10 is supposed to notify the operation terminal 4 that has initiated the session for which “anon#LP_1” has been issued of the completion of the process. However, since this session has been terminated as described above, the image processing apparatus 10 does not make this process completion notification. Instead, the image processing apparatus 10 refers to the session information illustrated in FIG. 10B, which includes “anon#LP_1” as the association information, and notifies the user terminal 20, which has initiated the session corresponding to this session information, of the completion of the process (step S26). Upon receipt of this notification, the user terminal 20 displays a message indicating that the scan process is completed (step S27).

As described above, in the exemplary embodiment, an operation log of a first terminal is transferred to another terminal (second terminal) in response to an operation performed using the second terminal without using information uniquely identifying a user (for example, the user ID). To transfer the operation log, the user needs to perform the log transfer operation (operation for causing the first terminal and the second terminal to perform NFC communication in the exemplary embodiment). Thus, the user who is permitted to use the operation log is limited to a user who is able to bring the first and second terminals close to each other.

2 Modifications

The above-described exemplary embodiment is merely an example that embodies the present invention and may be modified in the following manner. In addition, the above-described exemplary embodiment and each of modifications described below may be appropriately combined.

2-1 Log Transfer Operation

The log transfer operation is not limited to the operation (operation for causing the first and second terminals to perform NFC communication) described in the exemplary embodiment. For example, the log transfer operation may be an operation for causing the first and second terminals to perform short-range wireless communication (communication based on Bluetooth or a piconet) other than NFC communication. In addition, the log transfer operation may be an operation for permitting association, which is performed based on content displayed on the operation terminal 4.

Figure 15:
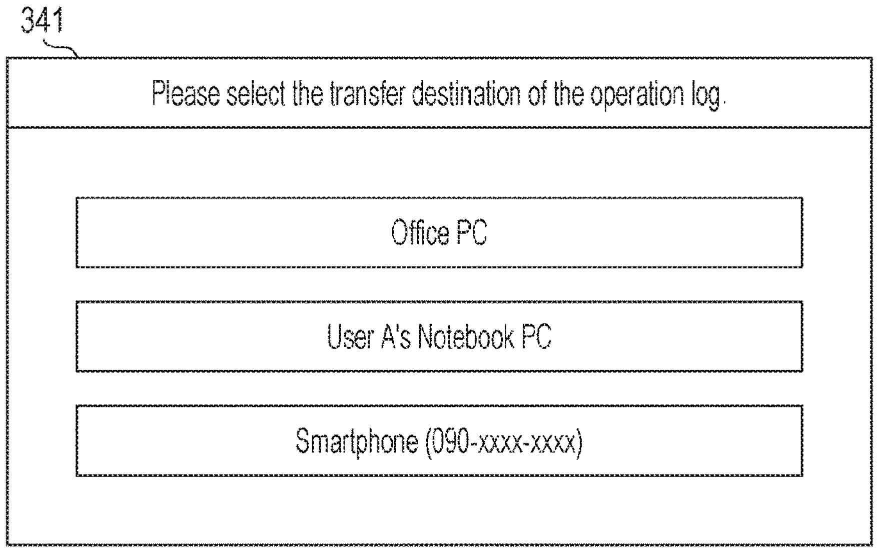
FIG. 15 illustrates an example of a screen displayed on a first terminal.

FIG. 15 illustrates an example of a screen displayed on the first terminal. In the example illustrated in FIG. 15, a screen including a character string “Please select the transfer destination of the operation log.” and operation member images respectively for “Office PC”, “User A’s Notebook PC”, and “Smartphone (090-xxxx-xxxx)” is displayed on a display panel 341 of the display unit 34 of the operation panel 30 (the first terminal in this example). All the character strings of the operation member images denote the operation terminals 4. In this modification, a user operation of selecting one of the operation member images is accepted by the accepting/responding unit 224 as an operation for associating the first session information with the second session information. Upon accepting this operation, the accepting/responding unit 224 transmits information denoting a screen for confirming whether to permit this association to one of the first and second terminals that has not accepted this operation (the second terminal in the example illustrated in FIG. 15). The accepting/responding unit 224 is an example of a “transmitting unit” according to an aspect of the present invention.

Figure 16:
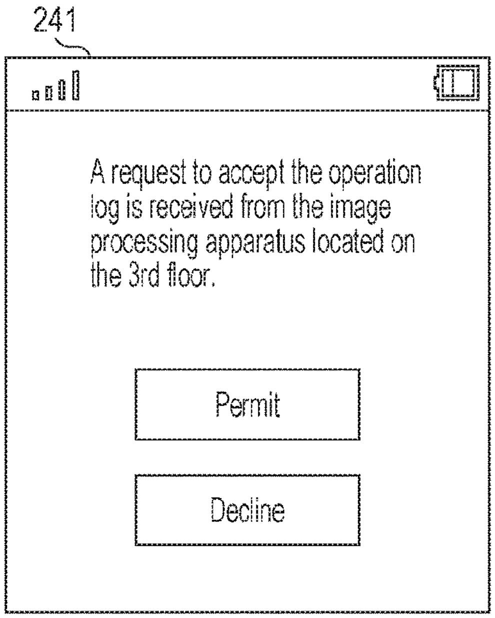
FIG. 16 illustrates an example of a screen displayed on a second terminal.

FIG. 16 illustrates an example of a screen displayed on the second terminal. In the example illustrated in FIG. 16, a screen including a character string “A request to accept the operation log is received from the image processing apparatus located on the 3rd floor.” and operation member images for “Permit” and “Decline” is displayed on a display panel 241 of the display unit 24 of the user terminal 20 (the second terminal in this example). In this case, the session associating/dissociating unit 703 of the image processing apparatus 10 performs the association if the operation terminal 4 serving as the transmission destination of this confirmation screen (the user terminal 20 serving as the second terminal in the example of FIG. 16) accepts an operation of permitting the association. For example, if the user selects “Permit”, the session information (first session information) for the operation panel 30 is associated with the session information (second session information) for the user terminal 20. If the user selects “Decline”, this association is not performed. With this configuration, the first session information is associated with the second session information and the operation log is transferred only in the case where permission for association is obtained.

In the example described above, the session associating/dissociating unit 703 assumes an operation of associating the first and second terminals (an operation of selecting an operation member image illustrated in FIG. 15), which is performed based on content displayed on the first terminal (the operation panel 30 in the above example), as the log transfer operation described above. With this configuration, the user who is permitted to use the operation log is limited to a user who is able to operate the first terminal.

The session associating/dissociating unit 703 associates the first session information with the second session information when the user performs an operation of permitting the association (an operation of selecting “Permit” illustrated in FIG. 16) based on the content displayed on the other terminal (the user terminal 20 in the above example). With this configuration, the user who is permitted to use the operation log is limited to a user who is able to operate both the first and second terminals.

The second terminal, that is, the operation terminal 4 to which the operation log is transferred, may display the candidate operation terminals 4 from which the operation log is to be transferred so as to allow the user to perform an operation of selecting one of the candidate operation terminals 4. In this case, the user who is permitted to use the operation log is limited to a user who is able to operate the second terminal. In this case, the first terminal may allow the user to perform an operation to permit the association. With this configuration, the user who is permitted to use the operation log is limited to a user who is able to operate both the first and second terminals.

In addition to the operations mentioned above, the operation performed based on content displayed on the operation terminal 4 may be an operation of tilting or shaking the operation terminal 4 if the operation terminal 4 is a smartphone, for example. In such a case, an image indicating a direction in which the operation terminal 4 is tilted or an image indicating a shaken smartphone may be displayed. If the user knows that these operations are the log transfer operation, these tilting operation and shaking operation (that is, operations performed on the operation terminal 4) may be used as the log transfer operation regardless of the content displayed on the operation terminal 4.

In addition, input of a one-time password may be requested in the operation of permitting the association. In this case, for example, a one-time password is displayed when a destination to which the operation log is transferred is selected in the screen of FIG. 15 displayed on the first terminal, for example. Then, after an operation of permitting transfer of the operation log is performed in the screen of FIG. 16 displayed on the second terminal, a screen requesting input of the one-time password is displayed. If the one-time password displayed on the first terminal is input, the operation log is transferred. For example, the session associating/dissociating unit 703 generates and displays the one-time password and verifies the input one-time password. With this configuration, it is less likely that the operation log is used by a third party, than in the case where the one-time password is not requested.

In addition, plural log transfer operations may be used. In this case, the operation log may be transferred in the following manner.

Figure 17:
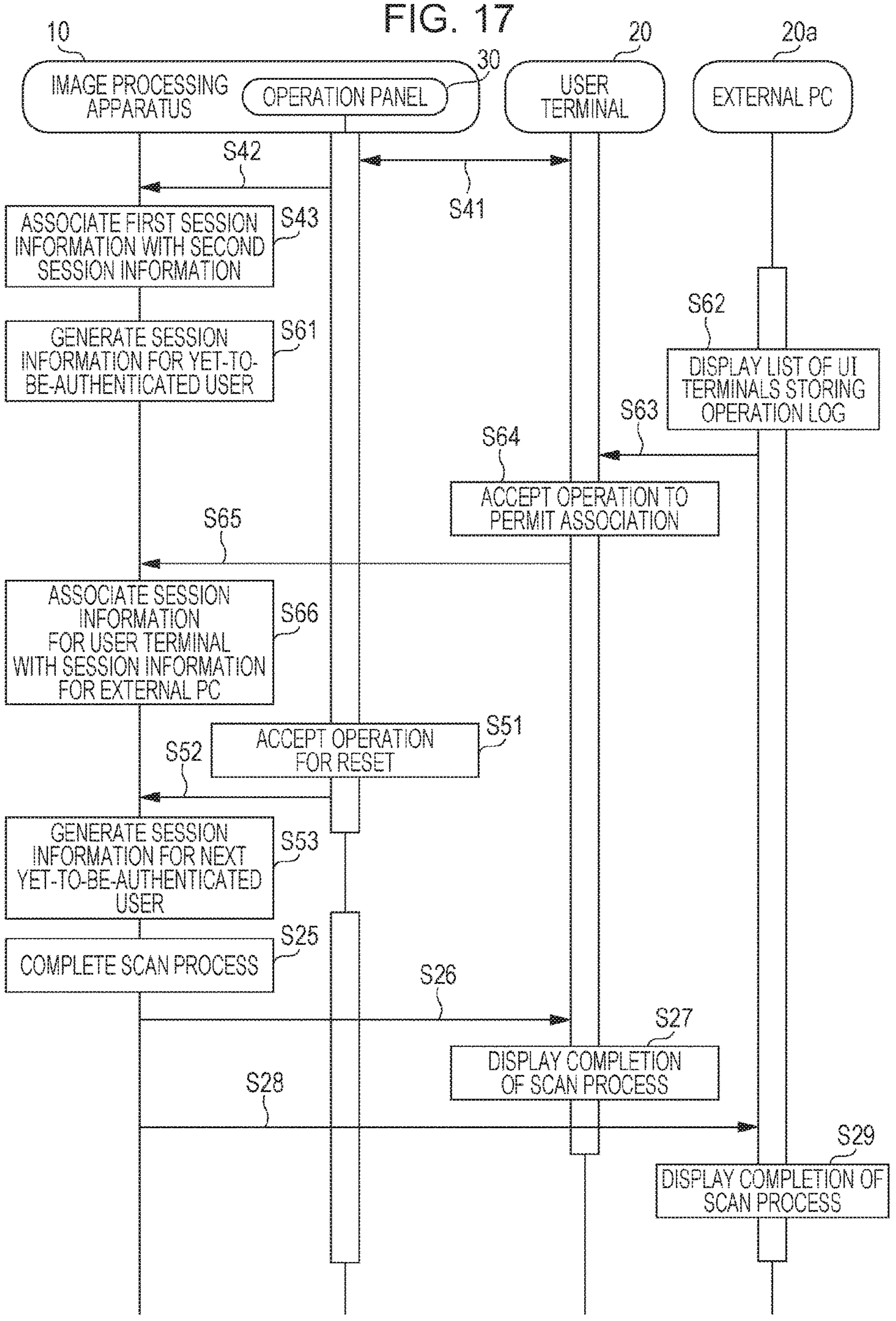
FIG. 17 illustrates an example of a procedure of an operation performed by the information processing system according to a modification.

FIG. 17 illustrates an example of a procedure of an operation performed by the information processing system 1 according to a modification. FIG. 17 illustrates an external personal computer (PC) 20*a* (one of the user terminals 20 illustrated in FIG. 1) in addition to the image processing apparatus 10, the operation panel 30, and the user terminal 20 illustrated in FIG. 12. In this example, steps S41 to S43 illustrated in FIG. 12 are performed. That is, the session information for the operation panel 30 is associated with the session information for the user terminal 20 in response to an operation for causing the operation panel 30 and the user terminal 20 to perform NFC communication (step S43).

Then, the user causes the external PC 20*a* to establish a connection to the image processing apparatus 10. Then, the image processing apparatus 10 generates session information including a yet-to-be-authenticated user ID of the user who is using the external PC 20*a* (step S61). Then, the external PC 20*a* displays a list of the operation terminals 4 for which the operation logs are stored in the image processing apparatus 10 (step S62). If the user performs an operation of selecting the user terminal 20 from the list, the external PC 20*a* requests the user terminal 20 to associate the session information for the user terminal 20 with the session information for the external PC 20*a* (specifically, transmits request data indicating the request) (step S63). Upon receipt of the request, the user terminal 20 displays, for example, the screen illustrated in FIG. 16 and accepts a user operation of permitting transfer of the operation log (step S64).

Upon accepting the operation of permitting transfer of the operation log in step S64, the user terminal 20 requests the image processing apparatus 10 to associate the session information for the user terminal 20 with the session information for the external PC 20*a* (step S65). Upon receipt of this request, the image processing apparatus 10 adds the corresponding yet-to-be-authenticated user ID to the session information for the user terminal 20 and the session information for the external PC 20*a*, thereby associating the session information for the user terminal 20 with the session information for the external PC 20*a* (step S66). At that time, since the session information for the user terminal 20 is already associated with the session information for the operation panel 30, the image processing apparatus 10 also associates the session information for the operation panel 30 with the session information for the external PC 20*a*.

When the scan process is completed (step S25), the image processing apparatus 10 notifies the user terminal 20 of the completion of the scan process (step S26) and notifies the external PC 20*a* of the completion of the scan process (step S28). Upon receipt of this notification, the external PC 20*a* displays a message indicating that the scan process is completed (step S29).

As described above, when associating session information for the second terminal with session information for another operation terminal 4 (hereinafter, referred to as a "third terminal"), the image processing apparatus 10 also associates session information for the first terminal with the session information for the third terminal. With this configuration, the operation log regarding operations performed up to that point is transferred even if the user switches the operation terminal 4 one after another. Note that, in this case, the image processing apparatus 10 may be configured not to associate the session information for the first terminal with the session information for the third terminal.

In addition, in the case where the session information for the first terminal is associated with session information for the operation terminal 4 (hereinafter, referred to as a "fourth terminal") other than the second terminal, the image processing apparatus 10 may associate the session information for the second terminal with the session information for the fourth terminal. With this configuration, the user just needs to perform an operation for causing the operation log of the first terminal to be transferred in the case where the user switches the operation terminal 4 one after another and the log regarding operations performed up to that time point is transferred as described. Note that, also in this case, the image processing apparatus 10 may be configured not to associate the session information for the second terminal with the session information for the fourth terminal.

2-2 Dissociation

The session associating/dissociating unit 703 may dissociate the first session information from the second session information in the case where a predetermined dissociation condition is satisfied. For example, upon completion of the process that has been started in response to an operation indicated by the operation log of the first terminal, the session associating/dissociating unit 703 determines that the dissociation condition is satisfied and dissociates the first session information from the second session information.

Figure 18:
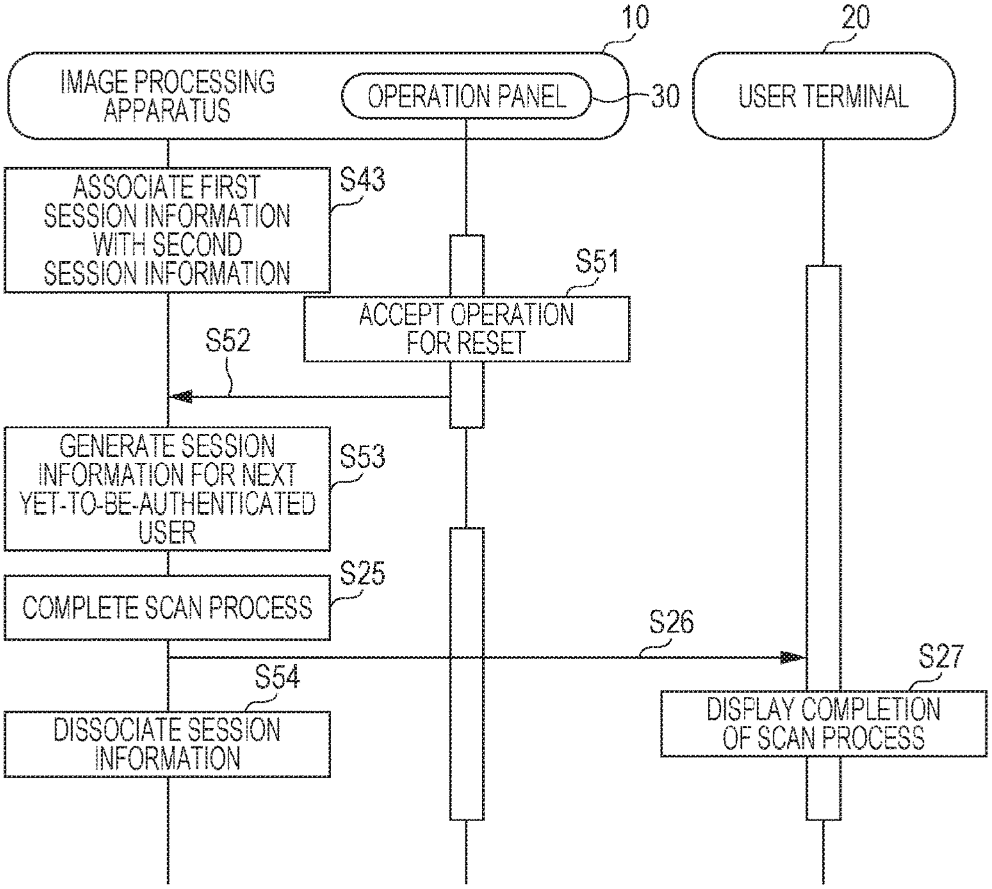
FIG. 18 illustrates an example of a procedure of an operation performed by the information processing system according to a modification.

FIG. 18 illustrates an example of a procedure of an operation performed by the information processing system 1 according to a modification. FIG. 18 illustrates step S43 (association of the session information for the operation panel 30 with the session information for the user terminal 20) and subsequent steps illustrated in FIG. 12. As in the example illustrated in FIG. 12, steps S51 to S53 are performed, and the image processing apparatus 10 completes the scan process (step S25) and notifies the user terminal 20 of the completion of the scan process (step S26). The image processing apparatus 10 then dissociates the first session information from the second session information (the operation log from the user terminal 20) (step S54), which have been associated in step S43.

After the dissociation, the second terminal (the user terminal 20 in this example) no longer performs the process based on the operation log of the first terminal (the operation log included in the session information including the user identification information "anon#LP_1" in this example). In the example illustrated in FIG. 12 or the like, there is one second terminal; however, session information for plural operation terminals 4 may be associated as the session information for the second terminals. In addition, session information for plural operation terminals 4 may be associated as the session information for the first terminals.

In these cases, as the number of pieces of session information for the first terminals or the number of pieces of session information for the second terminals increases, the number of processes performed using the operation log increases if the dissociation is not performed, consequently making the processing performed by the middleware layer 230 complicated. In this modification, the processing performed by the middleware layer 230 is made less complicated by performing dissociation, than in the case where the dissociation is not performed. Since dissociation is performed after the scan process completes in step S25, the user confirms the completion of the process that has been started in response to the user operation.

Note that the dissociation condition is not limited to the one described above. For example, the dissociation condition may be satisfied as a result of the user performing a specific operation.

Figures 19, 20A, 20B, 20C:
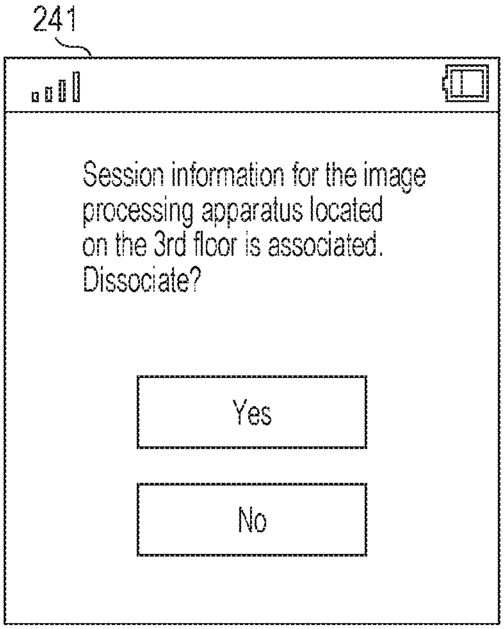
FIG. 19 illustrates an example of a screen displayed on the user terminal.
FIGS. 20A to 20C illustrate an example of an association table.

FIG. 19 illustrates an example of a screen displayed on the user terminal 20. In FIG. 19, the screen including a character string "Session information for the image processing apparatus located on the 3rd floor is associated. Dissociate?" and operation member images "Yes" and "No" is displayed on the display panel 241. If the user performs an operation of selecting "Yes" in this screen, the session associating/dissociating unit 703 determines that the dissociation condition is satisfied and dissociates the associated session information.

In addition, the session associating/dissociating unit 703 may determine that the dissociation condition is satisfied in the case where new session information is generated for the second terminal or in the case where the image processing apparatus 10 is powered off. In addition, the session associating/dissociating unit 703 may determine that the dissociation condition is satisfied in the case where NFC communication is performed between the first terminal and the second terminal. In either case, the processing performed by the middleware layer 230 is made less complicated than in the case where the dissociation is not performed.

2-3 Types of Operation Terminals

When performing a process based on the operation log, the middleware layer 230 may change a kind of the process depending on the type of the operation terminal 4 (the first terminal) from which the operation log is transferred and the type of the operation terminal 4 (the second terminal) to which the operation log is transferred. The operation terminals 4 are classified into a type that implements the local panel unit 110 illustrated in FIG. 6 (that is, the operation panel 30) and a type that implements the remote panel unit 120 (that is, the user terminal 20), for example.

Examples of the process based on the operation log include issuing a notification about completion of the process started in response to a past operation, displaying information set in the past (setting display process), and displaying a log of screens displayed in the past (screen-log display process). In this case, for example, the middleware layer 230 performs all of these three kinds of processes if the processes are based on the operation log of the operation panel 30 (if the first terminal is the type implementing the local panel unit 110). If the process is based on the operation log of the user terminal 20 (if the first terminal is the type implementing the remote panel unit 120), the middleware layer 230 only performs the setting display process and the screen-log display process (that is, does not issue the completion notification).

The middleware layer 230 makes a completion notification if the second terminal is the user terminal 20, for example, and performs all the three kinds of processes if the second terminal is the operation panel 30. As described above, the middleware layer 230 according to the modification changes types of processes to be performed using the operation log depending on whether the first terminal is a terminal of a first type or a terminal of a second type or depending on whether the second terminal is a terminal of the first type or a terminal of the second type. That is, the middleware layer 230 performs a process according to the types of the first and second terminals.

Note that the types into which the operation terminals 4 are classified are not limited to the ones described above. For example, the operation terminals 4 may be classified into devices portable by the user, such as a smartphone and a tablet terminal, or devices not portable by the user, such as the operation panel 30 and a desktop PC; or may be classified depending on the size of the display panel, such as devices having a display panel larger than equal to a threshold and devices having a display panel smaller than the threshold. For example, if a process based on the operation log includes a process involving a large amount of information to be displayed, the operation terminal 4 having a small display panel does not perform such a process. As described above, according to the exemplary embodiment, the middleware layer 230 performs a process according to the type of the operation terminal 4.

Note that processes performed by the middleware layer 230 according to the modification are not limited to processes based on the operation log. In the case where the middleware layer 230 performs various processes, such as a scan process, a print process, and a copy process, the processes performed by the middleware layer 230 may be changed depending on the type of the operation terminal 4. For example, the middleware layer 230 performs only the print process if the second terminal is the user terminal 20 and performs all the scan process, the print process, and the copy process if the second terminal is the operation panel 30.

In the example described above, the middleware layer 230 performs a process corresponding to the second type in response to an operation performed using the second terminal if the first terminal is of the first type and the second terminal is of the second type; however, the middleware layer 230 may perform the process corresponding to the first type in response to an operation performed using the second terminal by continuously using the type of the first terminal.

For example, in the case where the middleware layer 230 performs the scan process, the print process, and the copy process, the middleware layer 230 is supposed to perform only the print process in response to an operation performed using the user terminal 20 if the first terminal is the operation panel 30 and the second terminal is the user terminal 20; however, the middleware layer 230 performs all the scan process, the print process, and the copy process by continuously using the type of the operation panel 30.

2-4 Process Based on Operation Log of Currently Used Operation Terminal

The above examples have described the configuration where, in the case where the session information for the first terminal is associated with the session information for the second terminal and the second terminal is used as the operation terminal 4, a process is performed using the operation log of the first terminal; however, if an operation is performed using the second terminal thereafter, a process based on the operation log of the second terminal is also performed. In such a case, the middleware layer 230 makes a first process that is performed based on the operation log stored in association with the first terminal different from a second process that is performed based on the operation log stored in association with the second terminal among processes that are performed in response to operations of the second terminal.

For example, the middleware layer 230 performs, as the second process, all the completion notification process, the setting display process, and the screen-log display process described above; whereas the middleware layer 230 performs, as the first process, only the completion notification process. In this case, the user receives the completion notification for the process that has been started in response to an operation of the operation terminal 4 (the first terminal) in the past but is not allowed to display the settings set using the first terminal or the log of the screens displayed using the first terminal. As described above, according to the modification, the middleware layer 230 performs a process according to the operation log of the associated operation terminal 4 and the operation log of the other operation terminal 4.

2-5 Deletion of Operation Log

The session associating/dissociating unit 703 may delete a log of operations performed using the operation terminal 4. The session associating/dissociating unit 703 deletes the operation log, for example, if a deletion condition is satisfied. The deletion condition is satisfied, for example, when a user operation for deleting the operation log is performed or an elapsed time exceeds a threshold (so-called timeout occurs).

Note that even if the deletion condition is satisfied, the session associating/dissociating unit 703 does not delete the operation log associated with the second terminal. That is, the session associating/dissociating unit 703 deletes, on the basis of a user operation (operation of the operation terminal 4 or the image processing apparatus 10) or an elapsed time, a not-associated operation log from among the operation logs stored in the session information storage unit 705. The session associating/dissociating unit 703 serves as an example of a "deleting unit" according to an aspect of the present invention. In this way, the operation log of the not-associated terminal is deleted based on a user operation or an elapsed time.

2-6 Association

The session associating/dissociating unit 703 performs the associating by including the association information in the session information in the exemplary embodiment; however, the way of association is not limited to this one. For example, the session associating/dissociating unit 703 may perform the association by using an association table including associations between sessions, for example.

FIGS. 20A to 20C illustrate an example of the association table. FIG. 20A illustrates session information including the yet-to-be-authenticated user ID "anon#LP_1" that is not associated with any session information. FIG. 20B illustrates the session information including the yet-to-be-authenticated user ID "anon#LP_1" that is associated with the yet-to-be-authenticated user ID "anon#SMP_1" and session information including the yet-to-be-authenticated user ID "anon#SMP_1" that is associated with the yet-to-be-authenticated user ID "anon#LP_1". FIG. 20C illustrates pieces of session information respectively including the yet-to-be-authenticated user IDs "anon#LP_1", "anon#SMP_1", and "anon#PC_1" that are associated with the two other yet-to-be-authenticated user IDs.

Note that the association table may include sets of associated yet-to-be-authenticated user IDs instead of indicating association for each session information as in the example illustrated in FIGS. 20A to 20C. In addition, the association table may include a column that indicate the session information for the operation terminal 4 currently used by the user. In short, the association may be performed using any information that clearly indicates the association between the session information for the first terminal and the session information for the second terminal.

2-7 Reserved Association

The session associating/dissociating unit 703 associates the session information with the operation terminal 4 for which a session has been initiated in the exemplary embodiment; however, association with the operation terminal 4 may be reserved before a session is initiated for the operation terminal 4 and the association may be officially performed upon initiation of the session for the operation terminal 4.

FIG. 21 illustrates an example of session information according to the modification. The example in FIG. 21 illustrates session information in which the association information "anon#SMP_1" of the session information in FIG. 10A is replaced with "anon#SMP_1 (RESERVED)". For example, when the user performs an operation for causing the user terminal 20 and the operation panel 30 to perform NFC communication before establishing a connection between the user terminal 20 and the image processing apparatus 10, the session associating/dissociating unit 703 adds the association information illustrated in FIG. 21 to the session information. Then, after the user terminal 20 is connected to the image processing apparatus 10, the session associating/dissociating unit 703 replaces the association information with the one illustrated in FIG. 10A.

The reservation may allow a process, such as a notification, that occurs in the reserved state to be transferred to the officially associated operation terminal 4. For example, in the case where the middleware layer 230 makes a process completion notification in the reserved state, the notification is sent to the operation terminal 4 that has been reserved and now is officially associated.

2-8 Dissociating

The UI session management unit 702 dissociates the first terminal from the first session information if an instruction for finishing using the first terminal is accepted by the first terminal in the exemplary embodiment; however, the configuration is not limited to this one. The UI session management unit 702 may dissociate the first terminal from the first session information when the session associating/dissociating unit 703 performs association, for example. In this case, the UI session management unit 702 functions as a "first dissociating unit" according to an aspect of the present invention. In the modification, after the association is made, the user who is permitted to use the operation log of the first terminal is limited to the user of the second terminal.

2-9 Process Based on Operation Log

Processes based on the operation log are not limited to those (the completion notification process, the setting display process, and the screen-log display process) described in the exemplary embodiment. For example, a process of making a notification regarding the status of a process that has been started in response to a past operation, a process displaying a list of settings set in the past, a process of displaying information indicating the past setting tendency, and a process of displaying the previous screen may be performed as the processes based on the operation log. That is, any process that is performed based on an operation performed by the user in the past may be performed as the process based on the operation log.

2-10 First Terminal and Second Terminal

The exemplary embodiment has described the case where the operation panel 30 serves as the first terminal and the user terminal 20 serves as the second terminal; however, the configuration is not limited to this case. The user terminal 20 may serve as the first terminal, and the operation panel 30 may serve as the second terminal; or two different user terminals 20 may serve as the first and second terminals.

2-11 Functional Configuration Implementing Each Unit

In the exemplary embodiment and modifications described above, the accepting/responding unit 224, the session information storage unit 705, the middleware layer 230 respectively serve as an example of a transmitting unit, a memory, and a processing unit according to an aspect of the present invention. In addition, the session associating/dissociating unit 703 serves as an example of an associating unit and a deleting unit according to an aspect of the present invention. Further, the user session management unit 701 and the UI session management unit 702 serve as an example of a session generating unit, and the UI session management unit 702 serves as an example of a first dissociating unit and a second dissociating unit. However, the configuration is not limited to this example. For example, the operation image management unit 221 or the function unit 223 may function as the processing unit, or the function unit 223 and the middleware layer 230 may collaboratively function as the processing unit. In addition, the user session management unit 701, the UI session management unit 702, the session associating/dissociating unit 703, and the operation log management unit 704 may collaboratively function as the associating unit, the deleting unit, the first dissociating unit, and the second dissociating unit. In addition, the transmitting unit, the associating unit, the memory, the processing unit, the first dissociating unit, the second dissociating unit, the deleting unit, and the session generating unit may be provided separately from the components illustrated in FIG. 6.

2-12 Categories of Invention

The present invention is considered as an information processing apparatus such as the image processing apparatus described above, an operation terminal such as an operation panel or a user terminal, and an information processing system including such information processing apparatus and operation terminal. The present invention is also considered as an information processing method for implementing a process performed by the information processing apparatus and the operation terminal. In addition, the present invention is considered also as a program causing computers serving as the information processing apparatus and the user terminal to function as the units described above. The program may be provided in a form of a recording medium, such as an optical disc storing the program thereon, or may be provided in a manner such that the program is downloaded and installed to the computers via a communication line, such as the Internet, so as to be usable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one hardware processor configured to implement:
a session generating unit that generates, in a case where an operation is accepted from a first terminal with a user not uniquely identified, first session information in association with the first terminal, the first session information serving as a unit for managing communication for the first terminal, and that generates, in a case where an operation is accepted from a second terminal, second session information in association with the second terminal, the second session information serving as a unit for managing communication for the second terminal;
an associating unit that associates the first session information with the second session information by updating at least one of the first session information and the second session information to identify another of the first session information and the second session information in a case where an operation for associating the first terminal with the second terminal is accepted; and
a processing unit that performs, in a case where the first session information is associated with the second session information, a process using an operation log that is stored in association with the first terminal, in response to an operation performed using the second terminal.

2. The information processing apparatus according to claim 1, wherein the at least one hardware processor is further configured to implement:
a first dissociating unit that dissociates the first terminal from the first session information in response to the association of the first session information with the second session information by the associating unit.

3. The information processing apparatus according to claim 1, wherein the at least one hardware processor is further configured to implement:
a second dissociating unit that dissociates the first terminal from the first session information in a case where an instruction for finishing using the first terminal is accepted by the first terminal or a predetermined period passes without any operation being performed after the association of the first session information with the second session information by the associating unit.

4. The information processing apparatus according to claim 3, wherein the associating unit associates the first session information with the second session information in a case where the operation for associating the first terminal with the second terminal is accepted before the instruction for finishing using the first terminal is accepted by the first terminal.

5. The information processing apparatus according to claim 3, wherein the processing unit notifies a notification destination of information regarding a process that has been started before the instruction for finishing using the first terminal is accepted by the first terminal, the notification destination being a destination determined based on the session information associated by the associating unit.

6. The information processing apparatus according to claim 1, wherein the at least one hardware processor is further configured to implement:

a transmitting unit that transmits, in a case where the operation for associating the first terminal with the second terminal is accepted from the first terminal or the second terminal, information denoting a screen for confirming whether to permit the association to a terminal from which the operation for associating the first terminal with the second terminal is not accepted among the first terminal and the second terminal, wherein the associating unit associates the first session information with the second session information in a case where the terminal to which the information denoting the screen is transmitted accepts an operation for permitting the association.

7. The information processing apparatus according to claim 1, wherein the processing unit changes a kind of the process performed using the operation log depending on whether the first terminal is a terminal of a first type or a terminal of a second type or depending on whether the second terminal is a terminal of the first type or a terminal of the second type.

8. The information processing apparatus according to claim 1, wherein the processing unit makes, in a case where the first session information is associated with the second session information, a process performed based on an operation log that is stored in association with the first terminal different from a process performed based on an operation log stored in association with the second terminal among processes each performed in response to an operation performed using the second terminal.

9. The information processing apparatus according to claim 1, further comprising:

a memory that stores operation logs of terminals used to operate the information processing apparatus, the terminals including the first terminal and the second terminal wherein the at least one hardware processor is further configured to implement:

a deleting unit that deletes an operation log not relating to the session information that is associated by the associating unit among the operation logs stored in the memory, based on an operation performed on the corresponding one of the terminals, an operation performed on the information processing apparatus, or an elapsed time.

10. The information processing apparatus according to claim 1, wherein the associating unit associates the first session information with the second session information by assuming, as the operation for associating the first terminal with the second terminal, an operation for causing the first terminal and the second terminal to perform short-range wireless communication.

11. The information processing apparatus according to claim 1, wherein in a case in which the user is not uniquely identified, the first session information comprises a first user identification information field comprises a first anonymous user identifier and the second session information comprises a second user identification information field comprising a second anonymous user identifier, different than the first anonymous user identifier, and wherein associating the first session information with the second session information comprises updating the first session information to include the second anonymous user identifier and also updating the second session information to include the first anonymous user identifier.

12. The information processing apparatus according to claim 11, wherein in the case in which the user is not uniquely identified, the first session information further comprises a first terminal identification information identifying the first terminal and the second session information further comprises a second terminal identification information identifying the second terminal, and wherein the first session information comprises a plurality of processes performed by the first terminal during the session, and wherein in a case in which the first session information is associated with the second session information, the second information does not comprise the plurality of processes performed by the first terminal during the session.

13. The information processing apparatus according to claim 1, wherein the first session information and the second session information comprise a same plurality of fields with at least one different information included in at least a same one of those fields between the first session information and the second session information.

14. The information processing apparatus according to claim 1, wherein the second session information is generated after the first session information is generated, and wherein the associating unit associates the first session information with the second session information in response to a trigger from the first terminal.

15. An information processing method comprising:

generating, in a case where an operation is accepted from a first terminal with a user not uniquely identified, first session information in association with the first terminal, the first session information serving as a unit for managing communication for the first terminal;

generating, in a case where an operation is accepted from a second terminal, second session information in association with the second terminal, the second session information serving as a unit for managing communication for the second terminal;

associating the first session information with the second session information by updating at least one of the first session information and the second session information to identify another of the first session information and the second session information in a case where an operation for associating the first terminal with the second terminal is accepted; and performing, in a case where the first session information is associated with the second session information, a process using an operation log that is stored in association with the first terminal, in response to an operation performed using the second terminal.

16. A non-transitory computer readable medium storing a program causing a computer to execute a process for information processing, the process comprising:

generating, in a case where an operation is accepted from a first terminal with a user not uniquely identified, first session information in association with the first terminal, the first session information serving as a unit for managing communication for the first terminal;

generating, in a case where an operation is accepted from a second terminal, second session information in association with the second terminal, the second session information serving as a unit for managing communication for the second terminal;

associating the first session information with the second session information by updating at least one of the first session information and the second session information to identify another of the first session information and the second session information in a case where an operation for associating the first terminal with the second terminal is accepted; and performing, in a case where the first session information is associated with the second session information, a process using an operation log that is stored in association with the first terminal, in response to an operation performed using the second terminal.

* * * * *